June 1, 1971     D. J. HOWE     3,582,331
PROCESS FOR MAKING A SMALL LINEAR CHANGE IN A
PHOTOGRAPHIC IMAGE
Filed May 6, 1968
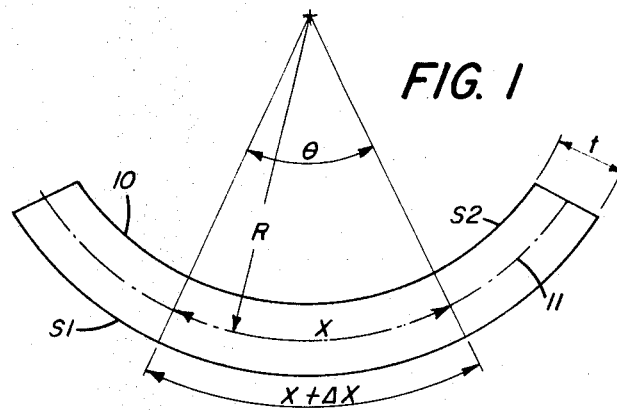
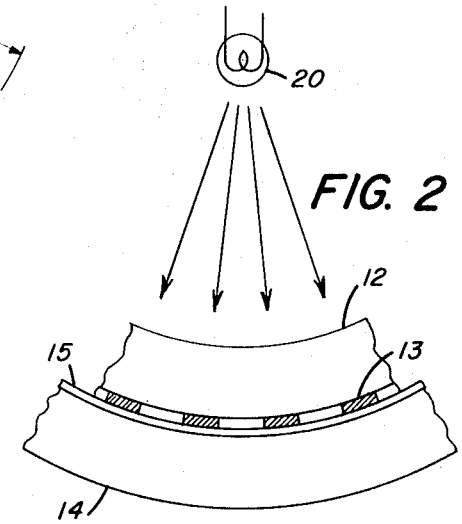
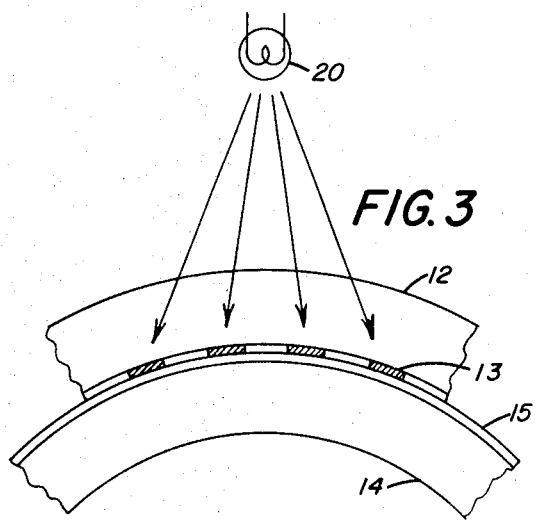
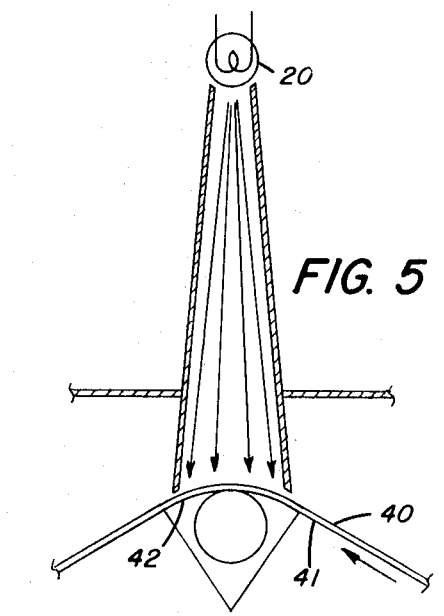
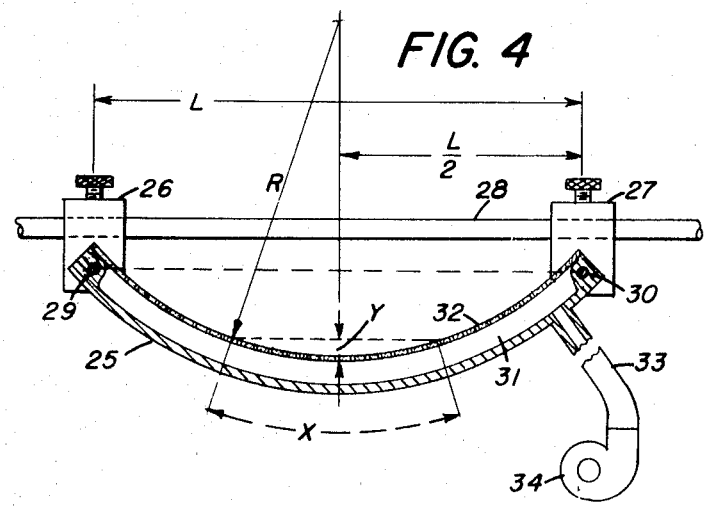
DONALD J. HOWE
INVENTOR.
BY *Lloyd F. Auerbach*
AGENT

United States Patent Office 3,582,331
Patented June 1, 1971

3,582,331
PROCESS FOR MAKING A SMALL LINEAR CHANGE IN A PHOTOGRAPHIC IMAGE
Donald J. Howe, Rochester, N.Y., assignor to Eastman Kodak Company, Rochester, N.Y.
Filed May 6, 1968, Ser. No. 726,758
Int. Cl. G03c 11/00
U.S. Cl. 96—46     8 Claims

ABSTRACT OF THE DISCLOSURE

A process for making a small, linear dimensional change in a photographic image to correct a change made in the course of taking, printing and/or processing the image in which an unexposed piece of film is formed into a segment of a cylinder with the emulsion surface thereof in contact with the emulsion surface of a negative that is to be corrected. On exposing through the negative and after processing, the image on the film will be increased or decreased in size, when flat, depending on the direction in which the film has been formed relative to the source of exposure illumination the size change being determined by the radius of curvature of the unexposed film.

FIELD OF THE INVENTION

This invention relates to a process for making a small linear dimensional change in a photographic image, and more particularly for making a linear dimensional change in a stereoscopic picture that is used with lenticulated film and wherein very small dimensional control is necessary.

DESCRIPTION OF THE PRIOR ART

Lenticular stereoscopic pictures of the parallax panoramagram type are well known. Such a picture is made through a line grid or a lenticular screen and, after subsequent processing and/or reproduction, is laminated with, or there is formed thereon, a lenticular viewing screen which must be in accurate registry with the lineiform image structure. In some methods of taking such pictures, the line grid or lenticular screen is spaced from the film and, because of such spacing and divergence of the light rays by the camera lens, the picture may be slightly larger than the taking screen because of simple geometric projection. Similarly, when viewing such a picture, because of the thickness of the viewing screen the picture is slightly larger than the viewing screen when viewed from a finite distance. Although allowances can be made for such size differences, the compensation is exact only for a particular relationship between the screen spacing, the focal length of the lens, and the viewing distance.

These relationships are described by H. E. Ives in "Parallax Panoramagrams Made with a Large Diameter Lens" Journal of Optical Society of America, vol. 20 (June 1930, pp. 332–342). This article describes a method for slightly enlarging a viewing grating by a similar geometric projection using a spaced grating and a light source at a finite distance. In practice, both the taking screen and the embossing plate used to form the lenticules on the finished picture are fixed in line spacing so that it would be difficult and expensive to make small changes in either the taking or viewing screen. In addition, in a complex photomechanical color reproduction process, many small and, in many cases, unpredictable size changes can occur in any one of the several photographic steps. The ideal situation would be to make any linear changes that are necessary just previous to the final photomechanical printing operation. The geometric projection previously mentioned is not suitable because of the loss of image definition that is introduced by the necessary spacing between the grid and the film. A loss of definition also occurs if a size change is made in a process camera with the usual process camera lens aperture because of the diffraction limitation on resolution. Further, it is extremely difficult to adjust a process camera to make size changes that are only a fraction of a percent.

SUMMARY OF THE INVENTION

One object of the invention is to provide a process by which a very small linear change can be made in a photographic reproduction and precisely controlled within very small limits.

Another object of the invention is to provide a process by which a very small linear change can be made in a photographic reproduction just prior to the final photomechanical printing operation.

Still another object of the invention is to provide a process by which a very small linear change can be made in a photographic reproduction by which there is no serious loss of image definition and which can be precisely controlled by contact printing.

These and other objects and advantages of the invention will be readily apparent to those skilled in the art by the detailed description which follows.

The above objects of the invention are attained by a process which makes use of the known fact that a beam of uniform cross section when formed into an arc results in shrinking or compression occurring on one surface of the beam and stretching or tension occurring on the other surface. With such formation of a beam into a generally arcuate form, the neutral axis has no stress and remains unchanged in length. In the present invention, a piece of film is considered as a beam and the unexposed piece of film is formed into a segment of a cylinder with the emulsion surface thereof in contact with the emulsion surface of a negative that is to be corrected. By exposing through the negative, the image that is contact printed on the unexposed film, after processing, will be expanded to an increased or decreased size when flat depending on the direction in which the film has been formed relative to the source of exposure illumination. With such a process the size change is predictable and can be easily controlled, the linear change being determined by the radius of curvature. As a result, any changes in image size that occur during the taking of the picture, processing of the negative, or printing of the negative can be corrected with one operation in a final stage of the process.

DESCRIPTION OF THE DRAWING

Reference is now made to the accompanying drawing wherein like reference numerals and characters designate like parts and wherein:

FIG. 1 is an enlarged cross-sectional view of a piece of film showing the deformation of the surfaces when formed into an arcuate shape;

FIG. 2 is an enlarged cross-sectional view showing a film negative and a sheet of light-sensitive material formed into a segment of a cylinder relative to a source of illumination for producing a positive linear change in the image printed on the light-sensitive material;

FIG. 3 is an enlarged cross-sectional view similar to FIG. 2 in which the negative and sheet of light-sensitive material are formed in a reverse direction for producing a negative linear change in the image on the sheet of light-sensitive material;

FIG. 4 is a side elevational view of a flexible vacuum frame for holding a negative and an unexposed sheet of light-sensitive material for making a determined linear change in the contact printed image; and FIG. 5 is a diagrammatic sectional view showing the application of the invention to a process for making linear changes in a strip of light-sensitive material.

DESCRIPTION OF THE EMBODIMENT OF THE INVENTION

With respect to FIG. 1, a piece of film 10 can be considered as a beam of uniform cross-section. When such a beam is bent to a radius of curvature R, the radius of curvature is measured from the neutral axis 11, or center of the beam. It is well known that the neutral axis has no stress and remains unchanged in length. The lower surface S1 is stretched by an amount $\Delta X$ and the upper surface S2 is compressed by the same amount. This relationship is set forth hereinbelow:

$$X = R\theta$$

$$X + \Delta X = \left(R + \frac{t}{2}\right)\theta$$

$$\Delta X = \frac{t}{2}\theta$$

wherein X is the arc into which the film is bent and is equal to the length of the picture, and $\theta$ is the angle, in radians, subtended by the arc X.

If a light-transmitting sheet 12 having an image layer 13 is to be contact printed onto a sheet 14 having a light-sensitive layer 15, a small change in size can be made in the reproduction by using the above principle. The order of magnitude of the desired change can be determined as follows:

A typical lineiform picture has 112 lines/inch (0.009" pitch) so that a picture 10 inches wide has 1,120 lines. The printed picture must correspond to the lenticular embossing plate within less than one-half a lenticule (0.0045") over a 10-inch width or within 0.045%. This is of the order of possible size changes that can occur in processing, especially when it is realized that at least three pieces of film might have been used to this point without making the final photomechanical reproduction. The geometrical considerations mentioned above would require size changes of the same order of magnitude.

With reference to FIG. 2, the sheet 14 is shown as being formed into a generally cylindrical segment (radius R) and the sheet 12 has been placed in contact therewith, the image layer 13 and light-sensitive layer 15 being in contact. The image on the sheet 12 has been stretched by $$\frac{t}{2}\theta$$

and the light-sensitive layer 15 has been compressed by $$\frac{t}{2}\theta$$

After exposure to a light source 20 and subsequent processing, the light-sensitive layer 14 of sheet 15 will expand to its original length when flat. The net change in size, $\Delta X$, of the image from the original image will be $t\theta$, when the sheets 12 and 14 are substantially the same in thickness.

If X is 10 inches, $$\theta = \frac{10}{R}$$

$$\Delta X = \frac{10t}{R}$$

If $t = .007$ inch $$\Delta X = \frac{(10)(.007)}{R} = \frac{.07}{R}$$

for a size change of .0045 inch in 10 inches $$R = \frac{.07}{.0045} = 15.5 \text{ inches}$$

Thus, with a reasonable radius of curvature, available film base thickness and the image in vacuum contact with the light-sensitive layer 14 of sheet 15, a size change of useful magnitude can be obtained.

With the sheet 14 formed as shown in FIG. 2, it can be considered as being concave relative to light source 20. When sheet 14 is formed in this way, the image printed on the light-sensitive layer 15 is larger, when flat, than that on sheet 12 and can be considered to be an image with a positive linear change. If the sheet 14 is formed as shown in FIG. 3, that is, it is curved away from light source 20, it can be considered as being convex relative to the light source. In this case, the image layer 13 is compressed and the light-sensitive layer is stretched so that the resulting image on sheet 14, when flat, will be smaller than that on sheet 12 and can be considered to be an image with a negative linear charge.

With reference to FIG. 4, the numeral 25 designates a flexible vacuum frame which is mounted between two sets 26, 27 of spaced brackets that are slidably mounted on spaced rods 28. The frame 25 is pivotally mounted at 29 to brackets 26 and at 30 to brackets 27. The frame 25 comprises a hollow section 31 and a perforated plate 32. The section 31 is connected by a hose 33 to a vacuum pump 34. By adjusting one pair of brackets relative to the other pair, the frame 25 is formed into a segment of a cylinder to produce a second order curve whose radius can be calculated to be constant within 3% under the conditions described above. The radius R can be measured by the rise Y:

$$Y = (L/2)^2 2/2R \text{ or } R = L^2 8Y$$

$$\Delta X = Xt/R$$

$$\Delta X = 8YXt/L^2$$

$$\Delta X = .00286Y$$

X—Picture width (10")
L—Distance between pivots (14")
t—Film thickness (.007)

The size change is directly proportional to the rise Y and can be easily measured with a ruler, that is, a 1½" rise produces approximately one-half lenticule change in a picture that is 10 inches in width.

To illustrate by way of an example, the frame 25 was formed to a radius R of 15½" to hold the plate 32 with a measured rise Y of 1½" for a 10-inch negative comprising a grid of 112 lines/inch (0.009" pitch) as the image carried on a surface of a light transmitting sheet. The grid was contact printed onto a sheet of unexposed film which was held on the plate 32 at the 15½ inch radius. After exposure and development, this negative was, in turn, contact printed in the same manner to form a positive reproduction of the original. When measured by a moire fringe ruler, the negative showed the expected size increase of one-half a grid line in 10 inches and the positive an increase of one line in 10 inches. In the same manner, a negative and a positive were made with a curvature that was convex relative to the lamp 20, in other words, as shown in FIG. 3 and a size decrease of the same amount was obtained.

Other devices can be used to provide an adjustably curved surface but the radius of such surface must be large enough so that the angle of the film to the light source does not result in an excessive decrease in exposure. The size change is normally one dimensional but can be a two-stage reproduction process if the intermediate negative is rotated 90° to produce a second dimensional change.

As shown in FIG. 5, a strip of light-transmitting material 40 having an image on one surface thereof can be moved with a strip of light-sensitive material 41 over an arcuate surface 42 to provide a continuous process. With such a process, it is necessary that the radius of curvature be at the immediate point of exposure and, preferably, that the two strips of material be moved intermittently into and through the exposure station. It can be readily appreciated that the process described hereinabove can be used for precisely controlling a reproduced image size and is applicable to making small linear changes in photographic images for use in the graphic arts, for making lenticules, for correcting aerial photographs, etc. Other uses will undoubtedly be suggested to those skilled in the art on the basis of the above description.

The invention has been described in detail with particular reference to preferred embodiments thereof, but it will be understood that variations and modifications can be effected within the spirit and scope of the invention.

I claim:

1. Process for making a small linear change in a reproduction of an image carried on a surface of a light-transmitting sheet, comprising the steps of
    (a) placing a sheet having a light-sensitive layer on one surface thereof on a member formed into a generally cylindrical segment, thereby compressing the concave surface and tensioning the convex surface thereof, the linear change in the surfaces of said sheet being determinable by measurement of the rise of the chord of the subtended angle defined by edges of said sheet, the radius of curvature of said member being fixed according to a desired linear change in a surface of said sheet;
    (b) positioning the surface of said light transmitting sheet which carries said image in contact with the light sensitive layer on said sheet;
    (c) exposing said light-sensitive layer to a source of radiation that is directed through said light-transmitting sheet to produce a latent image on said light-sensitive layer, and
    (d) returning said sheet having the light-sensitive layer on one surface thereof to a flat position whereby the image thereon is of a size different from the image on said light-transmitting sheet.

2. The process according to claim 1 including the step of photographically developing said latent image on said light-sensitive sheet.

3. The process according to claim 1 in which said light-sensitive layer is formed into a concave cylindrical surface relative to said source of radiation for effecting a positive linear change in said latent image.

4. The process according to claim 1 in which said light-sensitive layer is formed into a convex cylindrical surface relative to said source of radiation for effecting a negative linear change in said latent image.

5. Process for making a small linear change in a reproduction of the images carried on one surface of a light-transmitting strip of material, comprising the steps of
    (a) positioning the one surface of said light-transmitting strip in contact with the light-sensitive layer on a second strip of material;
    (b) moving said strips as a unit relative to a source of radiation in an exposure station in which successive transverse portions of said strips contact a member formed into a generally cylindrical segment whose axis is generally perpendicular to the direction of movement of said strips, the linear change in the surfaces of said sheets being determinable by measurement of the rise of the chord of the subtended angle defined by the contacting surface of said strips with said member, the radius of curvature of said member being fixed according to a desired linear change in a surface of said strips contacting said member; and
    (c) exposing each successive portion of said light-sensitive strip by directing said radiation through said light-transmitting strip to produce a latent image, each of whose linear change is in the direction of movement of said strips.

6. The process according to claim 5 including the step of photographically developing said latent images on said light-sensitive strip.

7. The process according to claim 5 wherein said cylindrical segment is concave relative to said source of radiation for effecting a positive linear change in said image.

8. The process according to claim 5 wherein said cylindrical segment is convex relative to said source of radiation for effecting a negative linear change in said images.

References Cited

UNITED STATES PATENTS

| | | | |
|---|---|---|---|
| 1,791,450 | 2/1931 | Kellogg | 96—46UX |
| 2,786,388 | 3/1957 | O'Brien et al. | 355—52X |

DAVID KLEIN, Primary Examiner

U.S. Cl. X.R.

355—52, 117, 132